(12) United States Patent
Cho et al.

(10) Patent No.: US 12,427,944 B2
(45) Date of Patent: Sep. 30, 2025

(54) CONTROL METHOD FOR DEPLOYING AIRBAG

(71) Applicant: HYUNDAI MOBIS CO., LTD., Seoul (KR)

(72) Inventors: Woong Lae Cho, Yongin-si (KR); Tae Won Park, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 75 days.

(21) Appl. No.: 18/399,047

(22) Filed: Dec. 28, 2023

(65) Prior Publication Data

US 2024/0391407 A1 Nov. 28, 2024

(30) Foreign Application Priority Data

May 24, 2023 (KR) .......................... 10-2023-0067024

(51) Int. Cl.
| | | |
|---|---|---|
| *B60R 21/015* | (2006.01) | |
| *B60R 21/21* | (2011.01) | |
| *B60R 21/01* | (2006.01) | |

(52) U.S. Cl.
CPC .. *B60R 21/01538* (2014.10); *B60R 21/01552* (2014.10); *B60R 21/21* (2013.01); *B60R 2021/01231* (2013.01); *B60R 2021/01238* (2013.01)

(58) Field of Classification Search
CPC ........ B60R 21/01538; B60R 21/01552; B60R 21/21; B60R 2021/01231
See application file for complete search history.

(56) References Cited

U.S. PATENT DOCUMENTS

2022/0256123 A1* 8/2022 Parenti ............... B60H 1/00871

FOREIGN PATENT DOCUMENTS

KR 10-2021-0070743 A 6/2021

* cited by examiner

*Primary Examiner* — Jacob M Amick
(74) *Attorney, Agent, or Firm* — NovoTechIP International PLLC

(57) ABSTRACT

A control method for deploying airbags includes a model-securing step of acquiring learning data reflecting a state of an in-vehicle person and securing a deep learning model by learning a deep learning network on the basis of the acquired learning data by means of a controller, an imaging step of imaging the in-vehicle person by means of a detector, a determining step of determining the state of the in-vehicle person by inputting image data of the imaged in-vehicle person into the deep learning network and by performing operations by means of the controller to determine the state of the in-vehicle person based on an output of the deep learning network which is based on the inputted image data, and a deployment control step of deploying an air bag in different ways, via the controller, depending on the state of the in-vehicle person when a collision accident occurs.

20 Claims, 2 Drawing Sheets

100 (100a,100b) 210 (210a,210b)

CONTROL METHOD FOR DEPLOYING AIRBAG

CROSS-REFERENCE TO RELATED APPLICATIONS

The present application claims priority to Korean Patent Applications No. 10-2023-0067024, filed May 24, 2023, the entire contents of which are incorporated herein for all purposes by this reference.

TECHNICAL FIELD

The present disclosure relates to a control method for deploying airbags, the control method safely protecting an in-vehicle person from danger due to a collision situation by deploying an airbag in consideration of the state of the in-vehicle person.

BACKGROUND

In the related art, motions related to behavior of a vehicle are sensed using an acceleration sensor and a pressure sensor that are passive sensors, and when a sensed value does not satisfy a specific deployment condition of several deployment conditions existing in a deployment logic in an airbag algorithm, front collision and side collision situations of a vehicle are sensed.

Accordingly, airbags that can protect a driver and passengers are deployed in accordance the kinds of collision and the specifications of an airbag system installed in a vehicle.

In the related art, it is possible to determine whether there is a collision and the degree of seriousness of a collision by calculating relative displacement/relative speed that are applied to a vehicle by sensing impulse that is applied the vehicle, as described above.

However, since a collision situation is sensed using only passive sensors, it is difficult to know the details inside a vehicle in a collision.

Accordingly, in order to optimally deploy airbags in accordance with the specifications of a vehicle, accurate information about a driver and passengers should be reflected in deployment of the airbags in a collision situation.

The description provided above as a related art of the present disclosure is just for helping understand the background of the present disclosure and should not be construed as being included in the related art known by those skilled in the art.

SUMMARY

The present disclosure has been made in an effort to solve the problems described above and an objective of the present disclosure is to provide a control method for deploying airbags, the control method safely protecting an in-vehicle person from danger due to a collision situation by deploying an airbag optimally for the situation inside a vehicle in consideration of the posture of the in-vehicle person, whether the seatbelt has been fastened, etc. in deployment of the airbag.

A configuration of the present disclosure for achieving the objectives described above provides a control method for deploying airbags, the control method including: a model-securing step of acquiring learning data reflecting a state of an in-vehicle person and securing a deep learning model by learning a deep learning network on the basis of the acquired learning data by means of a controller; an imaging step of imaging the in-vehicle person by means of a detector; a determining step of determining the state of the in-vehicle person by inputting image data of the imaged in-vehicle person into the deep learning network and by performing operations by means of the controller; and a deployment control step of deploying an air bag in different ways, depending on the state of the in-vehicle person when a collision accident occurs by means of the controller.

The control method may determine a head position of the in-vehicle person by obtaining x-axial, y-axial, and z-axial coordinate values of the head of the in-vehicle person in the determining step; and deploy airbags that are deployed in front of and at a side of the in-vehicle person while adjusting one or more of a point in time of deployment, a deployment pressure, and a deployment shape of the airbags in correspondence to the head position of the deployment control step.

The control method may deploy an airbag that is deployed in front of the in-vehicle person while adjusting the point in time of deployment of the airbag in correspondence to the head position of the in-vehicle person in a front-rear direction in the deployment control step.

The control method may deploy an airbag that is deployed in front of the in-vehicle person while adjusting a deployment shape of the airbag in correspondence to the head position of the in-vehicle person in a left-right direction and an up-down direction in the deployment control step.

When the head position of the in-vehicle person in a left-right direction is at a critical distance or less from a side of an outboard portion of the vehicle or the head position of the in-vehicle person is at a critical distance or less from a ceiling surface of the vehicle, the control method may deploy an airbag that is deployed at a side of the in-vehicle person in the deployment control step.

The control method may decrease a collision determination-critical value for deploying an airbag at a side of the in-vehicle person in the deployment control step as the head position of the in-vehicle person comes close to the side of the outboard or the ceiling surface.

The control method may determine personal information of the in-vehicle person by recognizing a face of the in-vehicle person in the determining step; and deploy an airbag that is deployed in front of the in-vehicle person while adjusting a deployment pressure of the airbag in correspondence to a body shape of the in-vehicle person based on the personal information in the deployment control step.

The control method may determine personal information of the in-vehicle person by recognizing the face of the in-vehicle person in the determining step; and deploy an airbag that is deployed in front of the in-vehicle person while adjusting one or more whether to deploy the airbag and a deployment pressure of the airbag in correspondence to medical information of the in-vehicle person based on the personal information in the deployment control step.

When the in-vehicle person is a patient having a problem with a knee in accordance with the medical information, the control method may not deploy a knee airbag or may deploy the knee airbag while reducing a deployment pressure of the knee airbag in the deployment control step.

The control method may determine whether a driver neglects looking toward a front area on the basis of a gaze of the driver and states of pupils and eyelids of the driver in the determining step; and decrease a collision determination-critical value for deploying an airbag in the deployment control step when it is determined that the driver drives without carefully looking toward the front area.

The control method may determine whether a driver dozes off at the wheel on the basis of a gaze of the driver and states of the pupils and eyelids of the driver in the determining step; and increase a collision determination-critical value for deploying an airbag in the deployment control step when it is determined that the driver dozes off at the wheel.

The control method may secure joint positions of the in-vehicle person by obtaining x-axial, y-axial, and z-axial coordinate values of joints of the in-vehicle person and determines a posture of the in-vehicle person by connecting the joint positions in the determining step; and deploy an airbag that is deployed in front of the in-vehicle person while adjusting one or more of the point in time of deployment of the airbag, whether to deploy the airbag, and a deployment pressure of the airbag in correspondence to a posture of the in-vehicle person in the deployment control step.

The control method may delay deployment of the airbag that is deployed in front of the in-vehicle person in the deployment control step when it is determined that the in-vehicle person is reclining.

The control method may not deploy the airbag that is deployed in front of the in-vehicle person in the deployment control step when it is determined that a leg of the in-vehicle person is on a dashboard.

The control method may increase a collision determination-critical value for deploying an airbag at a side of the in-vehicle person in the deployment control step when it is determined that the in-vehicle person leans his/her body on a side of an outboard.

When it is determined that an in-vehicle person in a rear seat leans his/her head on a front seat, the control method may increase a collision determination-critical value for deploying an airbag at a side of the front seat in the deployment control step.

When the upper body of the in-vehicle person is positioned in a region in which a center side airbag is deployed, the control method may increase a collision determination-critical value for deploying the center side airbag.

The control method may determine a body size of the in-vehicle person by connecting joint positions of the in-vehicle person in the determining step; and deploy the airbag that is deployed in front of the in-vehicle person while adjusting a deployment pressure of the airbag in correspondence to a body shape of the in-vehicle person based on the body size of the in-vehicle person in the deployment control step.

The control method may determine whether a seatbelt has been fastened by detecting the seatbelt on the basis of image data input to the deep learning network in the determining step; and deploy earlier an airbag that is deployed in front of the in-vehicle person in the deployment control step when it is determined that the seatbelt has not been fastened.

The control method may deploy the airbag that is deployed in front of the in-vehicle person while decreasing a deployment pressure of the airbag in the deployment control step when it is determined that the seatbelt has not been fastened.

The control method may decrease an operation-critical value of a seatbelt pretensioner in the deployment control step when it is determined that only a shoulder webbing or a wrap webbing of the seatbelt is worn.

Therefore, according to the present disclosure, when a car collision occurs, the state of the in-vehicle persons inferred through the deep learning network is reflected in deployment of airbags, so the airbags are optimally deployed in correspondence to the state of the in-vehicle persons, whereby the in-vehicle persons are more safely protected from the danger of the car collision.

BRIEF DESCRIPTION OF THE DRAWINGS

The above and other objectives, features and other advantages of the present disclosure will be more clearly understood from the following detailed description when taken in conjunction with the accompanying drawings, in which.

DETAILED DESCRIPTION

Figure 1:
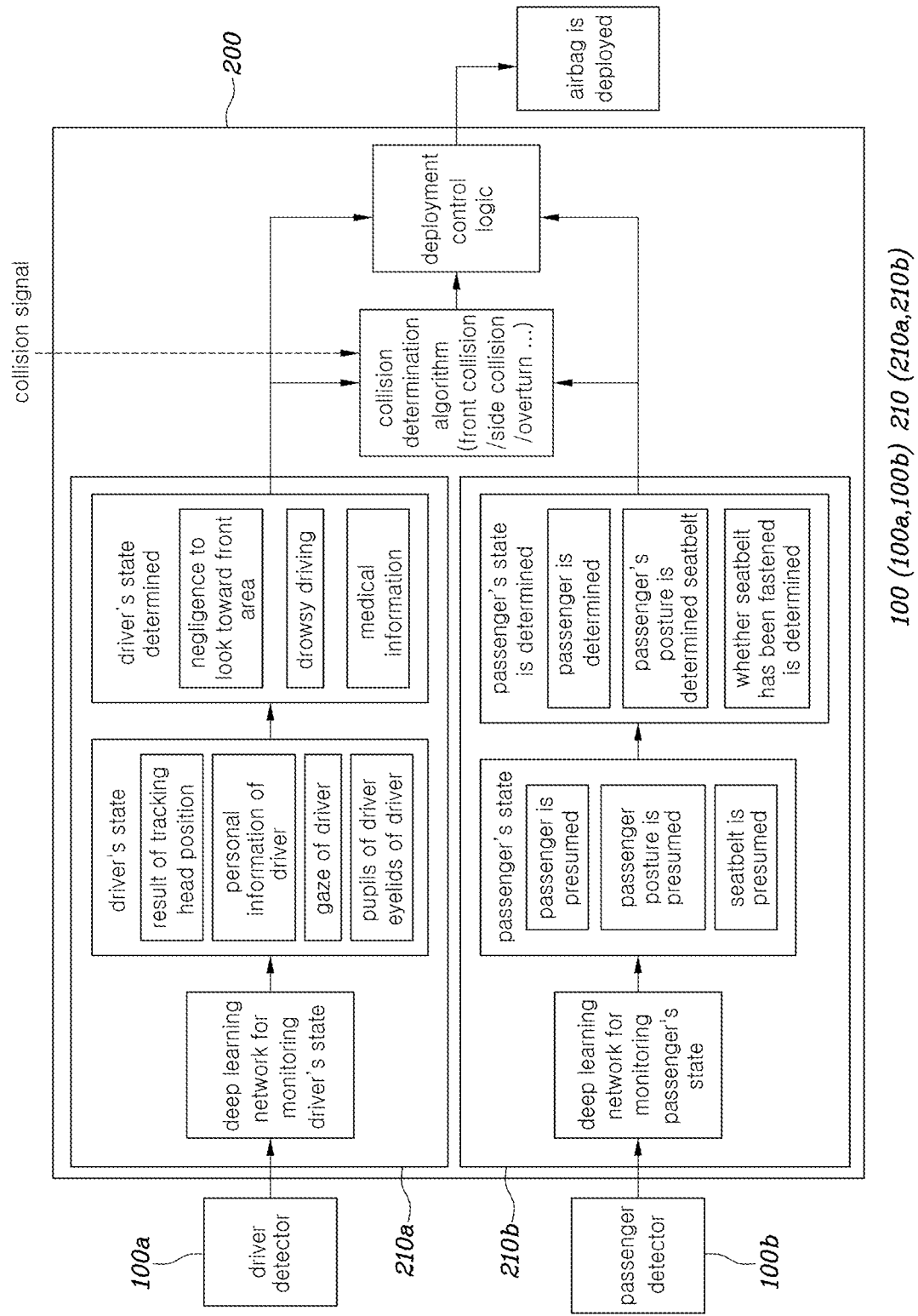
FIG. 1 is a block diagram schematically showing the configuration of an airbag deployment control unit according to the present disclosure.

Hereafter, embodiments of the present disclosure will be described in detail with reference to the accompanying drawings and the same or similar components are given the same reference numerals regardless of the numbers of figures and are not repeatedly described.

Terms "module" and "unit" that are used for components in the following description are used only for the convenience of description without having discriminate meanings or functions.

In the following description, if it is decided that the detailed description of known technologies related to the present disclosure makes the subject matter of the embodiments described herein unclear, the detailed description is omitted. Further, the accompanying drawings are provided only for easy understanding of embodiments disclosed in the specification, the technical spirit disclosed in the specification is not limited by the accompanying drawings, and all changes, equivalents, and replacements should be understood as being included in the spirit and scope of the present disclosure.

Terms including ordinal numbers such as "first" and "second" may be used to describe various components, but the components are not to be construed as being limited to the terms. The terms are used only to distinguish one component from another component.

It is to be understood that when one element is referred to as being "connected to" or "coupled to" another element, it may be connected directly to or coupled directly to another element or be connected to or coupled to another element with the other element therebetween. On the other hand, it should be understood that when one element is referred to as being "connected directly to" or "coupled directly to" another element, it may be connected to or coupled to another element without the other element therebetween.

Singular forms are intended to include plural forms unless the context clearly indicates otherwise.

It will be further understood that the terms "comprise" or "have" used in this specification specify the presence of stated features, steps, operations, components, parts, or a combination thereof, but do not preclude the presence or addition of one or more other features, numerals, steps, operations, components, parts, or a combination thereof.

A controller may include a communication device that communicates with another controller or a sensor to control corresponding functions, a memory that stores an operating system or logic commands and input/output information, and one or more processors that perform determination, calculation, decision, etc. for controlling corresponding functions.

Exemplary embodiments of the present disclosure are described hereafter in detail with reference to the accompanying drawings.

A control method for deploying airbags of the present disclosure includes: a model-securing step of acquiring learning data reflecting the state of an in-vehicle person and securing a deep learning model 210 by learning a deep learning network on the basis of the acquired learning data by means of a controller 200; an imaging step of imaging the in-vehicle person by means of a detector 100; a determining step of determining the state of the in-vehicle person by inputting image data of the imaged in-vehicle person into the deep learning network and by performing operations by means of the controller 200; and a deployment control step of deploying an air bag in different ways, depending on the state of the in-vehicle person when a collision accident occurs by means of the controller 200.

For example, in order to secure a deep learning model 210a for determining the state of a driver, a deep learning network is learned and fine-tuned by acquiring learning data for learning the deep learning network, thereby deciding a final deep learning model 210a.

A detector 100a, which may be a 2D camera-type vision sensor that senses infrared (IR) and RGB (colors), is installed inside a vehicle and images and recognizes the face of a driver in the driver seat.

Accordingly, it is possible to input video data such as a face image or video of the imaged driver into the deep learning network and perform a deep learning operation using a weight of the learned deep learning network.

It is possible to infer the state of the driver through such a deep learning operation. The representative state of a driver may include the head position of the driver, the driver's personal information, the drier's gaze, the states of the driver's pupils and eyelids, etc.

Accordingly, when a car collision occurs, the state of a driver inferred through the deep learning network is reflected in deployment of an airbag, so the airbag is optimally deployed in correspondence to the state of the driver, whereby the driver is more safely protected from the danger of the car collision.

As another example, in order to secure a deep learning model 210b for determining the states of the in-vehicle persons in the passenger seat and the rear seats except a driver, a deep learning network is learned and fine-tuned by acquiring learning data for learning the deep learning network, thereby deciding a final deep learning model 210b.

A detector 100b, which may be a 2D camera-type vision sensor that senses infrared (IR) and RGB (colors), is installed inside a vehicle and images and recognizes the in-vehicle persons in the passenger seat and the rear seats. In this case, the vision sensor that images the in-vehicle persons in the passenger seat and the rear seats should recognize general information of the in-vehicle persons, so the vision sensor may be disposed at a position where the inside of the vehicle and the in-vehicle persons are shown well.

Accordingly, it is possible to input video data such as an image or video of the imaged in-vehicle persons into the deep learning network and perform a deep learning operation using a weight of the learned deep learning network.

It is possible to infer the state of the in-vehicle persons through such a deep learning operation. The representative state of the in-vehicle persons in the passenger seat and the rear seats may include the posture of the in-vehicle persons, the body shape of the in-vehicle persons, the state of the seatbelts, etc.

Accordingly, when a car collision occurs, the state of the in-vehicle persons inferred through the deep learning network is reflected in deployment of airbags, so the airbags are optimally deployed in correspondence to the state of the in-vehicle persons, whereby the in-vehicle persons are more safely protected from the danger of the car collision.

Meanwhile, the present disclosure determines the head position of an in-vehicle person by obtaining x-axial, y-axial, and z-axial coordinate values about the head of the in-vehicle person in the determining step; and, in the deployment control step, can deploy airbags that are deployed in front of and at a side of the in-vehicle person while adjusting one or more of the point in time of deployment, the deployment pressure, and the deployment shape of the airbags, depending on the head position of the in-vehicle person.

Figure 2:
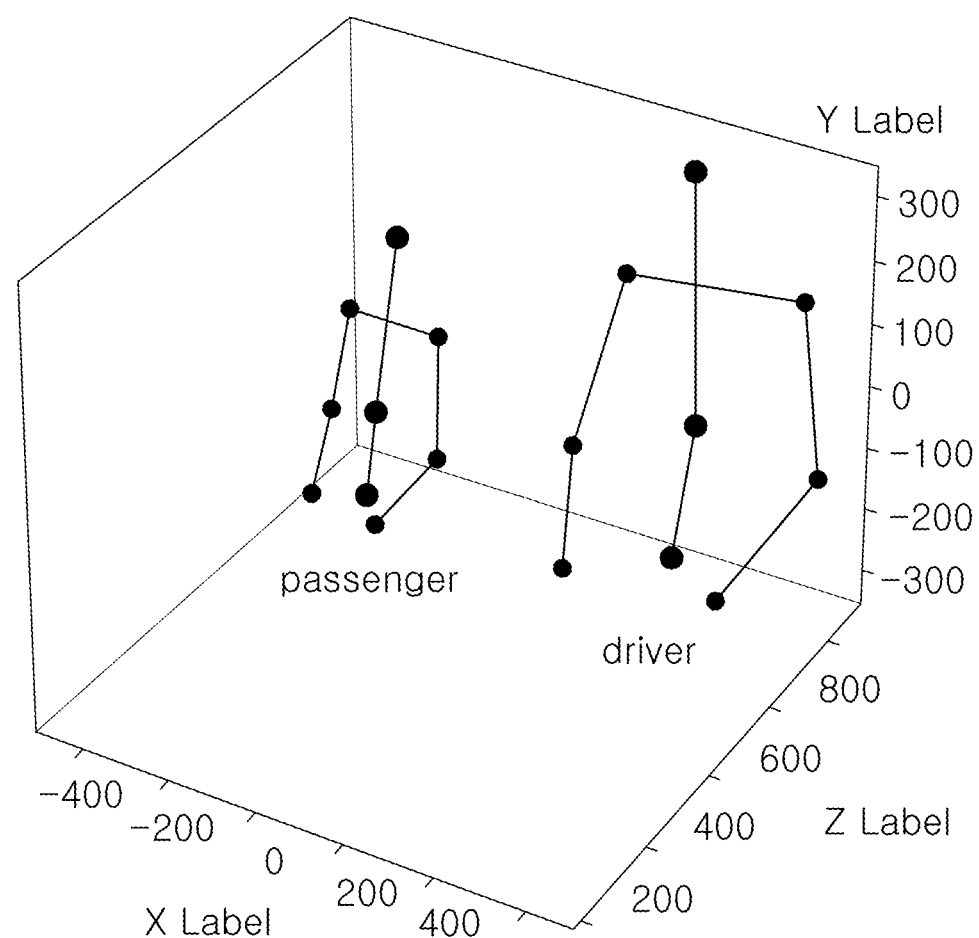
FIG. 2 is a diagram for explaining a technique of obtaining the head position and joint positions of an in-vehicle person in accordance with the present disclosure.

As shown in FIG. 2, the x-axis corresponds to the left-right direction, the y-axis corresponds to the up-down direction, and the z-axis corresponds to the front-rear direction.

Accordingly, an x value is the result of tracking a left-right-directional motion of an in-vehicle person, a y value is the result of tracking an up-down-directional motion of an in-vehicle person, and a z value is the result of tracking a front-rear-directional motion of an in-vehicle person.

Accordingly, in a front car collision, a front airbag is deployed on the basis of x, y, and z values that are the results of tracking the head of an in-vehicle person, whereby airbags are deployed optimally for the head motion of the in-vehicle person and the danger of the in-vehicle person being injured is reduced.

Preferably, in the deployment control step, it is possible to deploy the airbag that is deployed in front of an in-vehicle person while adjusting the point in time of deployment of the airbag in correspondence to the head position of the in-vehicle person in the front-rear direction.

For example, the farther the head position of a driver from a dashboard, the larger the z value.

Accordingly, by delaying deployment of the front airbag that is deployed in front of the driver when the z value is large and by deploying earlier the front airbag when the z value is small, the airbag is deployed at the point in time at which the driver is loaded on the airbag. Accordingly, the danger of the driver being injured is reduced and the driver's head is more stably held.

In addition, in the deployment control step, it is possible to deploy an airbag that is deployed in front of an in-vehicle person while adjusting the deployment shape of the airbag in correspondence to the head position of the in-vehicle person in the left-right direction and the up-down direction.

For example, when an x value is biased left or right from an up-down center line of a driver seat as the result of tracking the head position of a driver in the left-right direction, it is possible to more stably hold the head of the driver by deploying a front airbag while adjusting the deployment shape in correspondence to the head position of the driver.

Further, when a y value is biased up or down from a left-right center line of a driver seat as the result of tracking the head position of a driver in the up-down direction, it is possible to more stably hold the head of the driver by deploying a front airbag while adjusting the deployment shape in correspondence to the head position of the driver.

For reference, a tether may be used to adjust the deployment shape of a front airbag in the present disclosure. That is, many tethers may be connected in a front airbag and the tethers are selectively released by an actuator, so the deployment shape of the front airbag can be adjusted by operation of the tethers.

In addition, when the head position of an in-vehicle person in the left-right direction is at a critical distance or less from a side of an outboard or the head position of an in-vehicle person is at a critical distance or less from the ceiling surface, it is possible to deploy an airbag that is deployed at a side of the in-vehicle person in the deployment control step.

For example, when it is determined that the head of a driver is positioned close to a door of the vehicle (i.e., within a predetermined distance of the door) on the basis of an x value tracking the head position of the driver in a front collision situation, it is possible to not only deploy a front airbag, but control a side airbag and a curtain airbag to be also deployed together.

Further, when it is determined that the head of a driver is positioned close to the ceiling of the vehicle on the basis of a y value tracking the head position of the driver in a front collision situation, it is possible to not only deploy a front airbag, but control a side airbag and a curtain airbag to be also deployed together.

In addition, in the deployment control step, the closer the head position of an in-vehicle person to a side of an outboard or a ceiling surface, the smaller the collision determination-critical value for deploying an airbag at a side of the in-vehicle person can be controlled.

For example, when it is determined that the head of a driver is positioned close to a door of the vehicle, a side airbag is deployed earlier by decreasing the collision determination-critical value of the side airbag, thereby protecting the head of the driver.

Further, when it is determined that the head of a driver is positioned close to the ceiling of the vehicle, a side airbag and/or a curtain airbag are deployed earlier by decreasing the collision determination-critical values of the side airbag and/or the curtain airbag, thereby protecting the head of the driver.

Meanwhile, the present disclosure determines personal information of an in-vehicle person by recognizing the face of the in-vehicle person in the determining step; and can deploy an airbag that is deployed in front of the in-vehicle person while adjusting the deployment pressure of the airbag in correspondence to the body shape of the in-vehicle person based on the personal information in the deployment control step.

That is, when the face of an in-vehicle person is recognized through the detector 100 with personal information such as a face image and a body size of in-vehicle persons stored in advance, a personal information result matched with the face of the in-vehicle person is output, and accordingly, the body size of the in-vehicle person is determined on the basis of the personal information of the in-vehicle person.

Accordingly, when an in-vehicle person is a female adult with a small body shape or a child, it is possible to prevent an injury to the in-vehicle person by weakly deploying an airbag.

In addition, the present disclosure determines personal information of an in-vehicle person by recognizing the face of the in-vehicle person in the determining step; and can deploy an airbag that is deployed in front of the in-vehicle person while adjusting one or more of whether to deploy the airbag and the deployment pressure of the airbag in accordance with medical information of the in-vehicle person based on the personal information in the deployment control step.

That is, when the face of an in-vehicle person is recognized with individual information including medical information of the in-vehicle person stored in advance, a personal information result matched with the face of the in-vehicle person is output, and accordingly, the deployment state of an airbag is adjusted in accordance with medical information that is the personal information result of the in-vehicle person.

In detail, when an in-vehicle person is a patient having a problem with his/her knee in accordance with the medical information of the in-vehicle person, it is possible to not deploy a knee airbag or it is possible to deploy a knee airbag while decreasing the deployment pressure in the deployment control step.

That is, when a driver is a patient having a problem with his/her knee, there is a danger of a knee airbag hitting the knee of the driver, so it is possible to not deploy the knee airbag or it is possible to relatively weakly deploy the knee airbag in order to prevent the danger of injury to the knee part.

Meanwhile, in the present disclosure, whether a driver neglects looking toward the front area is determined on the basis of the gaze of the driver and the states of the pupils and eyelids of the driver in the determining step; and when it is determined that the driver drives without carefully looking toward the front area, it is possible to perform control of decreasing a collision determination-critical value for deploying an airbag in the deployment control step.

That is, when it is determined that a driver drives without carefully looking toward the front area of the vehicle in a front collision of the vehicle, the collision determination-critical value of a front airbag is decreased so that the front airbag is easily deployed in response to even a small collision signal, whereby the driver is protected.

Whether a driver dozes off at the wheel is determined on the basis of the gaze of the driver and the states of the pupils and the eyelids of the driver in the determining step; and when it is determined that the driver dozes off at the wheel, it is possible to increase the collision determination-critical value for deploying an airbag in the deployment control step.

That is, when it is determined that a driver was dozing off at the wheel in a front collision of a vehicle, the collision determination-critical value of a front airbag is increased to prevent an increase of the level of injury to the driver due to sudden impact accompanying deployment of a front airbag, whereby the driver is protected.

Further, it is possible to adjust the deployment shape of a front airbag in correspondence to the gaze of a driver. That is, it is possible to deploy a front airbag in different shapes when a driver looks toward a side and looks toward the front area.

Further, it is possible to estimate the center position of the face of a driver on the basis of the gaze of the driver and it is also possible to deploy a front airbag while adjusting the shape of the front airbag in correspondence to the estimated center position of the face.

Meanwhile, in the present disclosure, joint positions of an in-vehicle person are secured by obtaining x-axial, y-axial, and z-axial coordinate values of the joints of the in-vehicle person and the posture of the in-vehicle person is determined in the determining step; and it is possible to deploy an airbag that is deployed in front of the in-vehicle person while adjusting one or more of the point in time of deployment of the airbag, whether to deploy the airbag, and the deployment pressure, depending on the posture of the in-vehicle person in the deployment control step.

For example, the x-axis corresponds to the left-right direction, the y-axis corresponds to the up-down direction, and the z-axis corresponds to the front-rear direction.

Accordingly, x values are the results of tracking left-right-directional motions of the face center, joints such as the shoulders, chest, elbows, and wrist, and main body parts of an in-vehicle person in the passenger seat, y values are the results of tracking up-down-directional motions, and z values are the results of tracking front-rear-directional motions.

Accordingly, it is possible to presume the posture of the in-vehicle person in the passenger seat by using a skeleton technique that obtains x, y, and z values that are the results of tracking joints and main parts of a body and then connects the obtained joint positions.

Therefore, a front airbag is deployed in correspondence to the posture of the in-vehicle person in the passenger seat in a front collision accident of the vehicle, whereby the airbag is deployed optimally to the posture of the in-vehicle person in the passenger seat and accordingly the danger of injury to the in-vehicle person is further reduced.

For example, when it is determined that an in-vehicle person is reclining, it is possible to delay deployment of an airbag that is deployed in front of the in-vehicle person in the deployment control step That is, when it is determined that an in-vehicle person in the passenger seat is reclining such as a relax mode in a front collision, the distance between the upper body of the in-vehicle person in the passenger seat and a front airbag is large, so it is possible to stably hold the upper body of the in-vehicle person in the passenger seat on the airbag by delaying deployment of the front air bag.

Further, when an in-vehicle person in the passenger seat looks at a side, the face of the in-vehicle person in the passenger seat does not face the front, so it is also possible to deploy the front airbag while adjusting the shape of the front airbag appropriately to the profile.

As another example, when it is determined that a leg of an in-vehicle person is on the dashboard, it is possible to not deploy an airbag that is deployed in front of the in-vehicle person in the deployment control step.

That is, when a leg of an in-vehicle person in the passenger seat is on the dashboard in a front collision and a front airbag is deployed, the front airbag strongly hits the leg of the in-vehicle person and there is the danger of injury, so the front airbag for the passenger seat is controlled not to be deployed.

Further, when it is determined that an in-vehicle person leans his/her body on a side of an outboard, it is possible to increase the collision determination-critical value for deploying the airbag at a side of the in-vehicle person in the deployment control step.

For example, when it is presumed that an in-vehicle person in the passenger seat leans on a door in a front collision situation, the collision determination-critical value of the front airbag is maintained at the normal level but the collision determination-critical values of a side airbag and/or a curtain airbag are increased.

Accordingly, the side airbag and/or the curtain airbag that is deployed at a side of the passenger seat are not deployed when a small collision signal is generated, thereby preventing the danger of injury to the in-vehicle person in the passenger seat leaning on the door due to deployment of the airbags.

Further, when it is determined that an in-vehicle person in a rear seat leans his/her head on a front seat, it is possible to increase the collision determination-critical value for deploying the airbag at a side of the front seat in the deployment control step.

For example, when it is presumed that an in-vehicle person in a rear seat leans his/her head on a front seat in a front collision situation, the collision determination-critical value of a side airbag installed in the seatback of the front seat is increased.

Accordingly, the side airbag of the front seat is not deployed when a small collision signal is generated, thereby preventing the danger of injury to the in-vehicle person in the rear seat due to deployment of the side airbag of the front seat.

Further, when the upper body of an in-vehicle person is positioned in the region in which a center side airbag is deployed, it is possible to increase the collision determination-critical value for deploying the center side airbag in the deployment control step.

For example, when it is determined that the upper body of an in-vehicle person in the passenger seat is inclined toward the driver seat and positioned in the region in which a center side airbag is deployed upward in a front collision situation, the collision determination-critical value of the center side airbag is increased.

Accordingly, the center side airbag is not deployed when a small collision signal is generated, thereby preventing the danger of injury to the in-vehicle person in the passenger seat due to deployment of the center side airbag.

In addition, the present disclosure can determine the body size of an in-vehicle person by connecting joint positions of the in-vehicle person in the determining step; and can deploy an airbag that is deployed in front of the in-vehicle person while adjusting the deployment pressure of the airbag in correspondence to the body shape of the in-vehicle person based on the body size of the in-vehicle person in the deployment control step.

That is, it is possible to sense not only the posture of an in-vehicle person, but body measurements of the in-vehicle person such as the shoulder length and the upper body length using a skeleton-based body key point technique, whereby it is possible to estimate the body size.

Accordingly, when an in-vehicle person presumed from a body size is a female adult with a small body shape or a child, it is possible to prevent an injury to the in-vehicle person by relatively weakly deploying an airbag.

Meanwhile, the present disclosure can determine whether a seatbelt has been fastened by detecting the seatbelt on the basis of image data input to the deep learning network in the determining step; and can deploy earlier an airbag that is deployed in front of an in-vehicle person when it is determined the seatbelt has not been fastened in the deployment control step.

For example, when image data obtained by the detector 110 are input, it is possible to not only detect a seatbelt through an image recognition algorithm of the deep learning network, but discriminately detect a shoulder webbing surrounding the shoulder part of the seatbelt and a wrap webbing surrounding the stomach part of the seatbelt Accordingly, when it is determined that a driver and an in-vehicle person in the passenger seat do not have their seatbelts fastened in a front collision situation, it is possible to safely hold the in-vehicle persons by deploying front airbags earlier.

Further, when it is determined that a seatbelt has not been fastened, it is possible to deploy an airbag that is deployed in front of the in-vehicle person while reducing the deployment pressure of the airbag in the deployment control step.

That is, when it is determined that a driver and an in-vehicle person in the passenger seat do not have their seatbelts fastened in a front collision situation, front airbags are deployed earlier with the deployment pressure reduced, thereby reducing the danger of injury that may be caused by hitting the driver and the in-vehicle person in the process of deployment of the airbags.

Further, when it is determined that only the shoulder webbing or the wrap webbing is worn, it is possible to decrease an operation-critical value of a seatbelt pretensioner in the deployment control step.

That is, when it is determined that a driver and an in-vehicle person in the passenger seat wear only the shoulder webbings or the wrap webbings of their seatbelts in a front collision situation, it is possible to increase the holding force of the seatbelts even only by wearing a single webbing by decreasing the operation-critical values of the seatbelt pretensioners.

For reference, when a seatbelt has not been fastened, it is possible to not operate a seatbelt pretensioner by increasing the operation-critical value of the seatbelt pretensioner.

Accordingly, when a car collision occurs, the state of the in-vehicle persons inferred through the deep learning network is reflected in deployment of airbags, so the airbags are optimally deployed in correspondence to the state of the in-vehicle persons, whereby the in-vehicle persons are more safely protected from the danger of the car collision.

Although the present disclosure was described with reference to the detailed embodiments, it is apparent to those skilled in the art that the present disclosure may be changed and modified in various ways without the scope of the present disclosure and it should be noted that the changes and modifications are included in claims.

What is claimed is:

1. A control method for deploying airbags in a vehicle, the control method comprising:
   a model-securing step of acquiring learning data, via a controller, reflecting a state of an in-vehicle person and securing a deep learning model, via the controller, by learning a deep learning network based on the acquired learning data;
   an imaging step of imaging, via a detector, the in-vehicle person;
   a determining step of determining, via the controller, the state of the in-vehicle person by inputting image data of the imaged in-vehicle person into the deep learning network and by performing operations by means of the controller to determine the state of the in-vehicle person based on an output of the deep learning network which is based on the inputted image data; and
   a deployment control step of deploying an airbag in different ways, via the controller, depending on the state of the in-vehicle person when a collision accident occurs,
   further comprising:
   determining a head position of the in-vehicle person by obtaining x-axial, y-axial, and z-axial coordinate values of the head of the in-vehicle person in the determining step; and
   deploying airbags that are deployed in front of and at a side of the in-vehicle person while adjusting one or more of a point in time of deployment of the airbags, a deployment pressure of the airbags, and a deployment shape of the airbags in correspondence to the head position in the deployment control step.

2. The control method of claim 1, further comprising deploying a front airbag in front of the in-vehicle person while adjusting the point in time of deployment of the front airbag in correspondence to the head position of the in-vehicle person in a front-rear direction in the deployment control step.

3. The control method of claim 1, further comprising deploying a front airbag in front of the in-vehicle person while adjusting a deployment shape of the airbag in correspondence to the head position of the in-vehicle person in a left-right direction and an up-down direction in the deployment control step.

4. The control method of claim 1, wherein, when the head position of the in-vehicle person in a left-right direction is at a critical distance or less from a side of an outboard portion of the vehicle or the head position of the in-vehicle person is at a critical distance or less from a ceiling surface of the vehicle, the control method further comprises deploying a side airbag at a side of the in-vehicle person in the deployment control step.

5. The control method of claim 4, further comprising decreasing a collision determination-critical value for deploying the side airbag at the side of the in-vehicle person in the deployment control step when the head position of the in-vehicle person comes within a predetermined distance of the side of the outboard portion or the ceiling surface of the vehicle.

6. The control method of claim 1, further comprising:
   determining personal information of the in-vehicle person by recognizing a face of the in-vehicle person in the determining step; and
   deploying a front airbag in front of the in-vehicle person while adjusting a deployment pressure of the front airbag in correspondence to a body shape of the in-vehicle person based on the personal information in the deployment control step.

7. The control method of claim 1, further comprising:
   determining personal information of the in-vehicle person by recognizing a face of the in-vehicle person in the determining step; and
   deploying a front airbag in front of the in-vehicle person while adjusting a deployment pressure of the front airbag in correspondence to medical information of the in-vehicle person based on the personal information in the deployment control step.

8. The control method of claim 7, wherein, when the in-vehicle person is a patient having a problem with a knee in accordance with the medical information, the control method further comprises not deploying a knee airbag or deploying the knee airbag while reducing a deployment pressure of the knee airbag in the deployment control step.

9. The control method of claim 1, further comprising:
   determining whether a driver of the vehicle neglects looking toward a front area of the vehicle based on a gaze of the driver and states of pupils and eyelids of the driver in the determining step; and
   decreasing a collision determination-critical value for deploying an airbag in the deployment control step when it is determined that the driver is driving without looking toward the front area of the vehicle.

10. The control method of claim 1, further comprising:
    determining whether a driver of the vehicle has dozed off at a steering wheel of the vehicle based on a gaze of the driver and states of pupils and eyelids of the driver in the determining step; and
    increasing a collision determination-critical value for deploying an airbag in the deployment control step when it is determined that the driver has dozed off at the steering wheel.

11. A control method for deploying airbags in a vehicle, the control method comprising:
- a model-securing step of acquiring learning data, via a controller, reflecting a state of an in-vehicle person and securing a deep learning model, via the controller, by learning a deep learning network based on the acquired learning data;
- an imaging step of imaging, via a detector, the in-vehicle person;
- a determining step of determining, via the controller, the state of the in-vehicle person by inputting image data of the imaged in-vehicle person into the deep learning network and by performing operations by means of the controller to determine the state of the in-vehicle person based on an output of the deep learning network which is based on the inputted image data; and
- a deployment control step of deploying an airbag in different ways, via the controller, depending on the state of the in-vehicle person when a collision accident occurs, further comprising:
- securing joint positions of the in-vehicle person by obtaining x-axial, y-axial, and z-axial coordinate values of joints of the in-vehicle person and determining a posture of the in-vehicle person by connecting the joint positions in the determining step; and
- deploying a front airbag in front of the in-vehicle person while adjusting (a) one or more of a point-in-time of deployment of the airbag, (b) whether to deploy the airbag, and (c) a deployment pressure of the airbag in correspondence to the determined posture of the in-vehicle person in the deployment control step.

12. The control method of claim 11, further comprising delaying deployment of the front airbag in front of the in-vehicle person in the deployment control step when it is determined that the in-vehicle person is reclining.

13. The control method of claim 11, further comprising increasing a collision determination-critical value for deploying a side airbag at a side of the in-vehicle person in the deployment control step when it is determined that the in-vehicle person leans his/her body on a side of an outboard portion of the vehicle.

14. The control method of claim 11, wherein, when it is determined by the controller that an in-vehicle person in a rear seat of the vehicle leans his/her head on a front seat of the vehicle, the control method further comprises increasing a collision determination-critical value for deploying a side airbag at a side of the front seat in the deployment control step.

15. The control method of claim 11, wherein, when an upper body of the in-vehicle person is positioned in a region in which a center side airbag is deployed, the control method further comprises increasing a collision determination-critical value for deploying the center side airbag.

16. The control method of claim 11, further comprising:
- determining a body size of the in-vehicle person by connecting joint positions of the in-vehicle person in the determining step; and
- deploying the front airbag that is deployed in front of the in-vehicle person while adjusting a deployment pressure of the front airbag in correspondence to a body shape of the in-vehicle person based on the body size of the in-vehicle person in the deployment control step.

17. A control method for deploying airbags in a vehicle, the control method comprising:
- a model-securing step of acquiring learning data, via a controller, reflecting a state of an in-vehicle person and securing a deep learning model, via the controller, by learning a deep learning network based on the acquired learning data;
- an imaging step of imaging, via a detector, the in-vehicle person;
- a determining step of determining, via the controller, the state of the in-vehicle person by inputting image data of the imaged in-vehicle person into the deep learning network and by performing operations by means of the controller to determine the state of the in-vehicle person based on an output of the deep learning network which is based on the inputted image data; and
- a deployment control step of deploying an airbag in different ways, via the controller, depending on the state of the in-vehicle person when a collision accident occurs, further comprising:
- determining whether a seatbelt in the vehicle has been fastened by detecting the seatbelt on the basis of image data input to the deep learning network in the determining step; and
- deploying a front airbag in front of the in-vehicle person earlier than a predetermined preset deployment time in the deployment control step when it is determined that the seatbelt has not been fastened.

18. The control method of claim 17, further comprising deploying a front airbag in front of the in-vehicle person while decreasing a deployment pressure of the front airbag in the deployment control step when it is determined that the seatbelt has not been fastened.

19. The control method of claim 17, further comprising decreasing an operation-critical value of a seatbelt pretensioner in the deployment control step when it is determined that only a shoulder webbing or a wrap webbing of the seatbelt is worn by the in-vehicle person.

20. A control method for deploying airbags in a vehicle, the control method comprising:
- a model-securing step of acquiring learning data, via a controller, reflecting a state of an in-vehicle person and securing a deep learning model, via the controller, by learning a deep learning network based on the acquired learning data;
- an imaging step of imaging, via a detector, the in-vehicle person;
- a determining step of determining, via the controller, the state of the in-vehicle person by inputting image data of the imaged in-vehicle person into the deep learning network and by performing operations by means of the controller to determine the state of the in-vehicle person based on an output of the deep learning network which is based on the inputted image data; and
- a deployment control step of deploying an airbag in different ways, via the controller, depending on the state of the in-vehicle person when a collision accident occurs, further comprising at least one of a following series of steps:
(A) determining personal information of the in-vehicle person by recognizing a face of the in-vehicle person in the determining step; and
  deploying a front airbag in front of the in-vehicle person while adjusting a deployment pressure of the front airbag in correspondence to a body shape of the in-vehicle person based on the personal information in the deployment control step; or (B) determining personal information of the in-vehicle person by recognizing the face of the in-vehicle person in the determining step; and
- deploying a front airbag in front of the in-vehicle person while adjusting a deployment pressure of the front airbag in correspondence to medical information of the in-vehicle person based on the personal information in the deployment control step; or (C) determining whether a driver of the vehicle neglects looking toward a front area of the vehicle based on a gaze of the driver and states of pupils and eyelids of the driver in the determining step; and
- decreasing a collision determination-critical value for deploying an airbag in the deployment control step when it is determined that the driver is driving without looking toward the front area of the vehicle; or (D) determining whether a driver of the vehicle has dozed off at a steering wheel of the vehicle based on a gaze of the driver and states of pupils and eyelids of the driver in the determining step; and
- increasing a collision determination-critical value for deploying an airbag in the deployment control step when it is determined that the driver has dozed off at the steering wheel.

* * * * *